(12) United States Patent
McCoy (10) Patent No.: US 11,083,187 B1
(45) Date of Patent: *Aug. 10, 2021

(54) SCAVENGING ANIMAL DETERRING FEEDER ASSEMBLY (71) Applicant: Margene McCoy, Ringgold, LA (US)

(72) Inventor: Margene McCoy, Ringgold, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/853,218

(22) Filed: Apr. 20, 2020

Related U.S. Application Data (63) Continuation-in-part of application No. 16/796,471, filed on Feb. 20, 2020.

(51) Int. Cl.
A01M 29/30 (2011.01)
A01K 5/02 (2006.01)

(52) U.S. Cl.
CPC ........... *A01M 29/30* (2013.01); *A01K 5/0225* (2013.01)

(58) Field of Classification Search
CPC ..... A01M 29/30; A01K 5/0225; A01K 5/015; A01K 5/02; A01K 5/01
See application file for complete search history.

(56) References Cited

U.S. PATENT DOCUMENTS

| 185,593 A | 12/1876 | Topliff | |
|---|---|---|---|
| 2,666,415 A | 1/1954 | Scruggs | |
| 2,896,575 A | 7/1959 | Scruggs | |
| 4,815,235 A * | 3/1989 | Faltinowski | A01G 13/10 52/101 |
| 5,167,099 A | 12/1992 | Nelson | |
| 5,528,858 A * | 6/1996 | Omdahl | A01G 13/10 47/32 |
| 6,622,653 B1 * | 9/2003 | Starnes, Jr. | A01K 5/01 119/51.01 |
| 6,684,812 B1 * | 2/2004 | Tucker | A01K 5/02 119/51.01 |
| 7,040,058 B2 | 5/2006 | Finkelstein | |
| 7,243,465 B2 | 7/2007 | Donoho | |
| 7,320,295 B2 | 1/2008 | Ehrreich | |
| D654,139 S | 2/2012 | Paulin | |
| 9,386,764 B2 | 7/2016 | Donoho | |
| 9,820,478 B1 * | 11/2017 | Balistreri | A01M 29/30 |
| 9,861,093 B2 | 1/2018 | Donoho | |
| D813,976 S | 3/2018 | Balistreri | |
| 2003/0005887 A1 * | 1/2003 | Graham | A01K 5/0225 119/52.1 |
| 2005/0081426 A1 * | 4/2005 | Hsia | A01G 13/105 43/124 |
| 2008/0173244 A1 * | 7/2008 | Welker | A01K 5/0225 119/51.01 |
| 2013/0145991 A1 | 6/2013 | Jackson | |
| 2015/0327510 A1 * | 11/2015 | Romero | A01K 7/02 119/51.11 |

(Continued)

*Primary Examiner* — Monica L Barlow
*Assistant Examiner* — Aaron M Rodziwicz
(74) *Attorney, Agent, or Firm* — R. Keith Harrison (57) ABSTRACT A scavenging animal deterring feeder assembly may include a feeder support stand including an elevated stand platform. A stand fence having a plurality of spaced-apart, upward-standing fence spikes may be carried by the stand platform. A feed-dispensing wildlife feeder may be carried by the stand platform of the feeder support stand and at least partially enclosed by the stand fence. A feeder retaining assembly may retain the feed-dispensing wildlife feeder on the stand platform.

12 Claims, 13 Drawing Sheets (56) References Cited

U.S. PATENT DOCUMENTS

| | | | | |
|---|---|---|---|---|
| 2016/0302383 A1* | 10/2016 | Frieden | ............ | A01K 5/02 |
| 2017/0055492 A1* | 3/2017 | Lowenthal | ............ | A01K 5/0114 |
| 2017/0208781 A1* | 7/2017 | Bogart | ............ | A01K 5/0225 |
| 2017/0280677 A1* | 10/2017 | Young | ............ | A01K 5/0291 |
| 2017/0360002 A1* | 12/2017 | Bellow | ............ | A01K 5/0225 |
| 2018/0010340 A1* | 1/2018 | Linson | ............ | A01M 29/30 |
| 2018/0153154 A1* | 6/2018 | Cosgrover | ............ | A01K 75/00 |
| 2018/0279579 A1* | 10/2018 | Alcoser | ............ | A01M 31/002 |
| 2018/0317449 A1* | 11/2018 | Landry | ............ | A01K 5/0291 |
| 2019/0090473 A1* | 3/2019 | West | ............ | A01M 31/008 |

* cited by examiner

SCAVENGING ANIMAL DETERRING FEEDER ASSEMBLY

CROSS-REFERENCE TO RELATED APPLICATIONS

This is a continuation-in-part of U.S. application Ser. No. 16/796,471, filed Feb. 20, 2020 and entitled SCAVENGING ANIMAL DETERRING FEEDER ASSEMBLY, which application is hereby incorporated by reference herein in its entirety.

FIELD

Illustrative embodiments of the disclosure generally relate to wildlife feeders for feeding wild game and other wildlife animals. More particularly, illustrative embodiments of the disclosure relate to a feeder assembly which deters wild hogs and other scavenging animals from accessing animal feed contained inside or dispensed from the feeders.

BACKGROUND

The background description provided herein is solely for the purpose of generally presenting the context of the illustrative embodiments of the disclosure. Aspects of the background description are neither expressly nor impliedly admitted as prior art against the claimed subject matter.

Wildlife feeders are commonly used to dispense particulate animal feed which attracts deer and other wild game animals for hunting, observation or other purposes. However, one of the common obstacles to using a wildlife feeder is the scavenging of the feed by wild hogs and other scavenging animals.

Accordingly, a feeder assembly which deters wild hogs and other scavenging animals from accessing animal feed contained inside or dispensed from the feeders may be desirable for some applications.

SUMMARY

Illustrative embodiments of the disclosure are generally directed to a scavenging animal deterring feeder assembly. An illustrative embodiment of the scavenging animal deterring feeder assembly may include a feeder support stand. The feeder support stand may include an elevated stand platform. A stand fence having a plurality of spaced-apart, upward-standing fence spikes may be carried by the stand platform. A feed-dispensing wildlife feeder may be carried by the stand platform of the feeder support stand and at least partially enclosed by the stand fence. A feeder retaining assembly may retain the feed-dispensing wildlife feeder on the stand platform.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left" "rear". "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
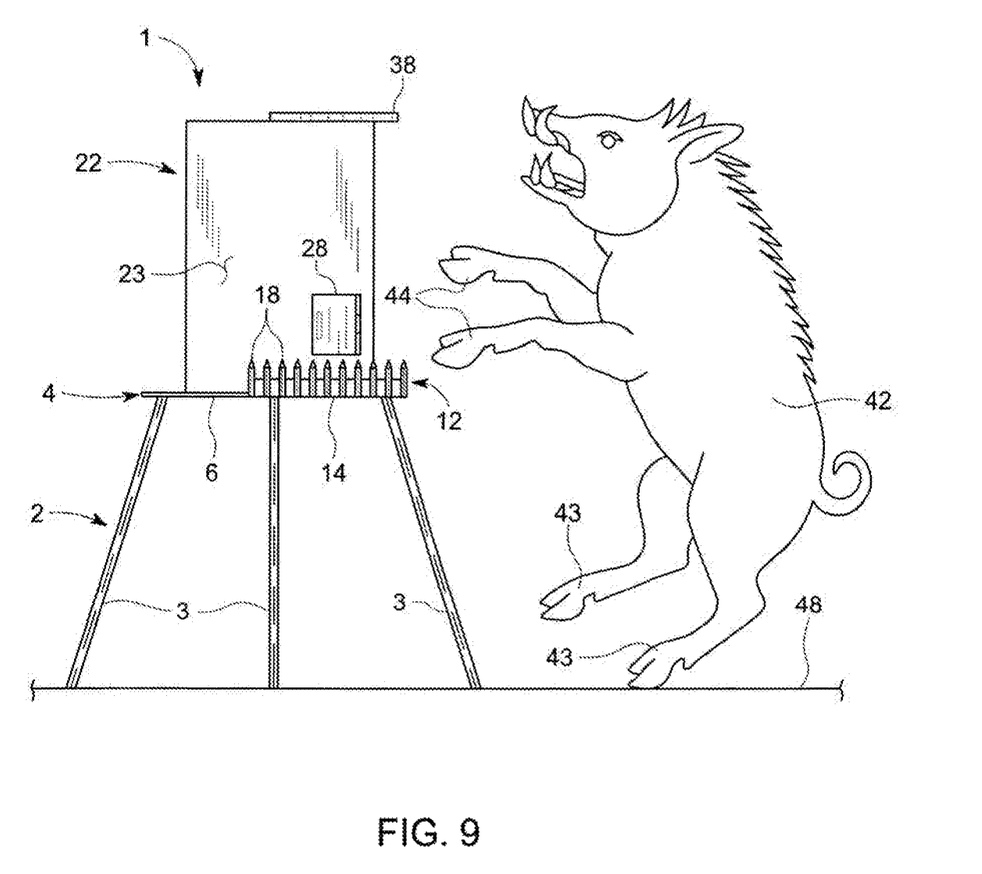
FIG. 9 is a right side view of the illustrative scavenging animal deterring feeder assembly, more particularly illustrating a scavenging animal attempting to access particulate animal feed in the wildlife feeder of the assembly in typical application of the assembly.

Referring initially to FIG. 9 of the drawings, an illustrative embodiment of the scavenging animal deterring feeder assembly, hereinafter assembly, is generally indicated by reference numeral 1. As will be hereinafter further described, the assembly 1 may be deployed on the ground or other support surface 48 in an area to which deer and/or other wildlife are to be attracted for hunting, observation or other purposes. The assembly 1 may include an elevated, feed-dispensing wildlife feeder 22 which contains a supply of animal feed 40 (FIG. 5) that is dispensed to attract the wildlife to the area in which the assembly 1 is deployed. The assembly 1 may deter a hog or other scavenging animal 42 from accessing animal feed contained in the wildlife feeder 22 for consumption.

Figure 1:
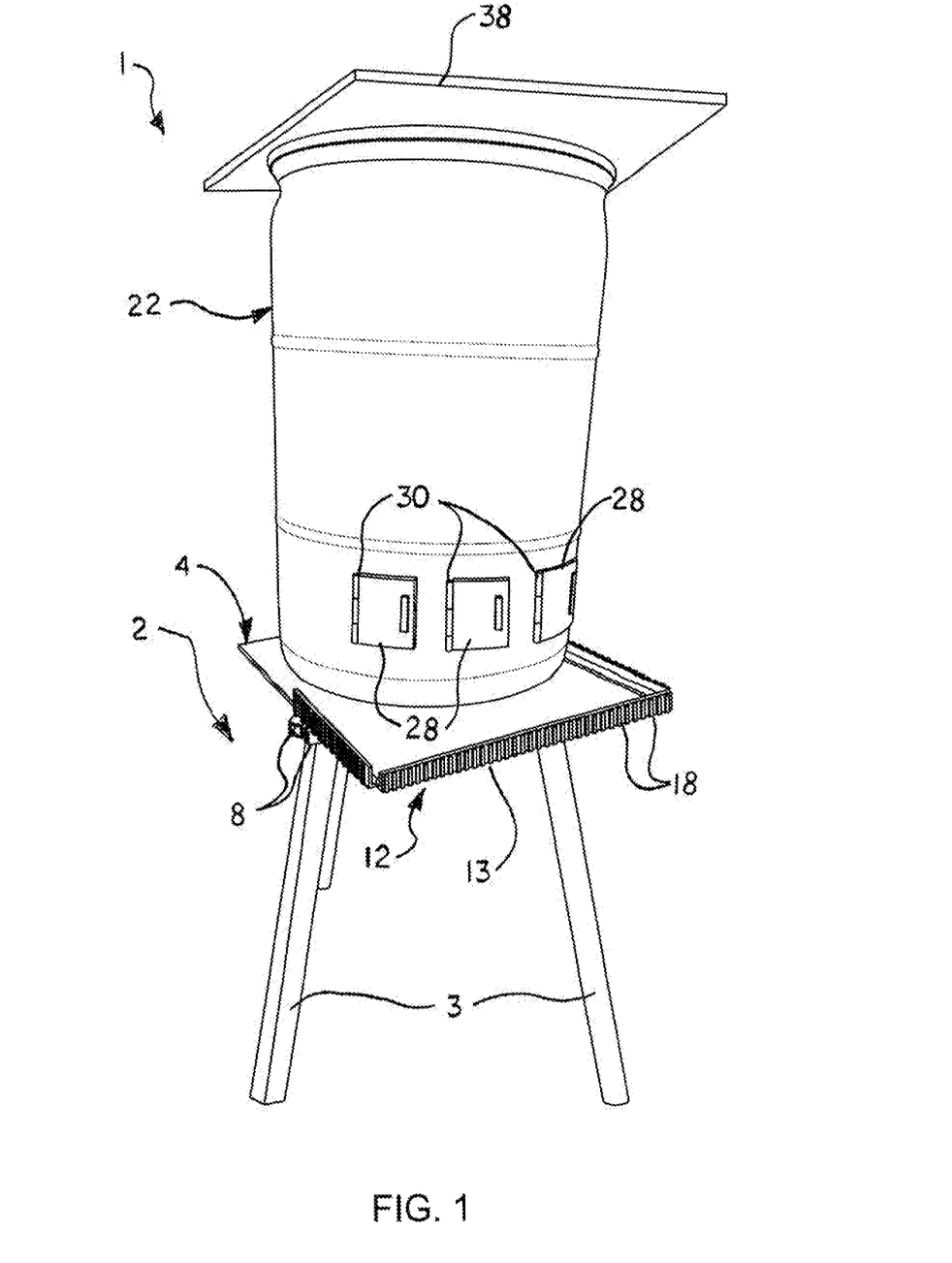
FIG. 1 is a front perspective view of an illustrative embodiment of the scavenging animal deterring feeder assembly.
Figure 2:
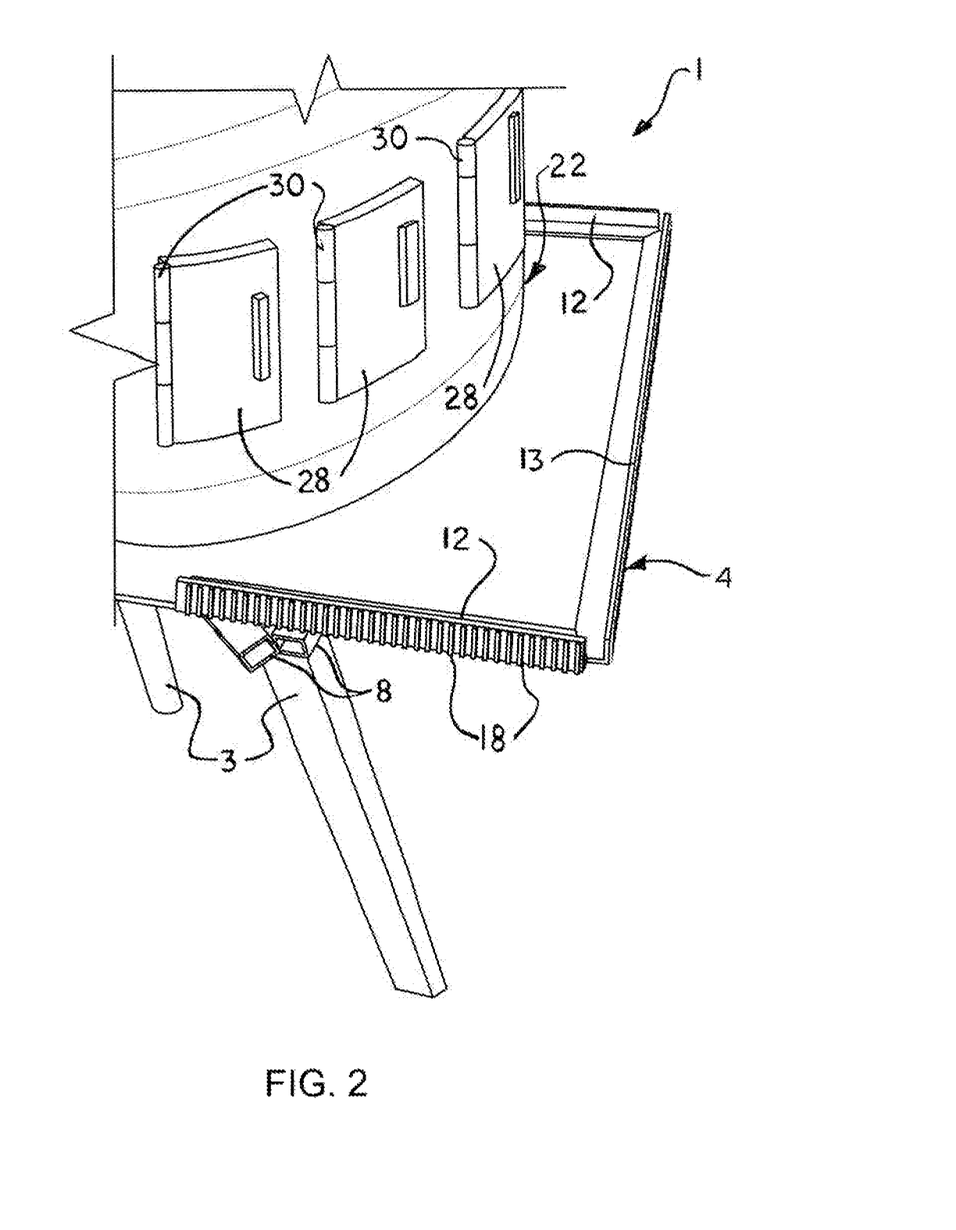
FIG. 2 is a front perspective view of a typical feeder support stand of the scavenging animal deterring feeder assembly.
Figure 3:
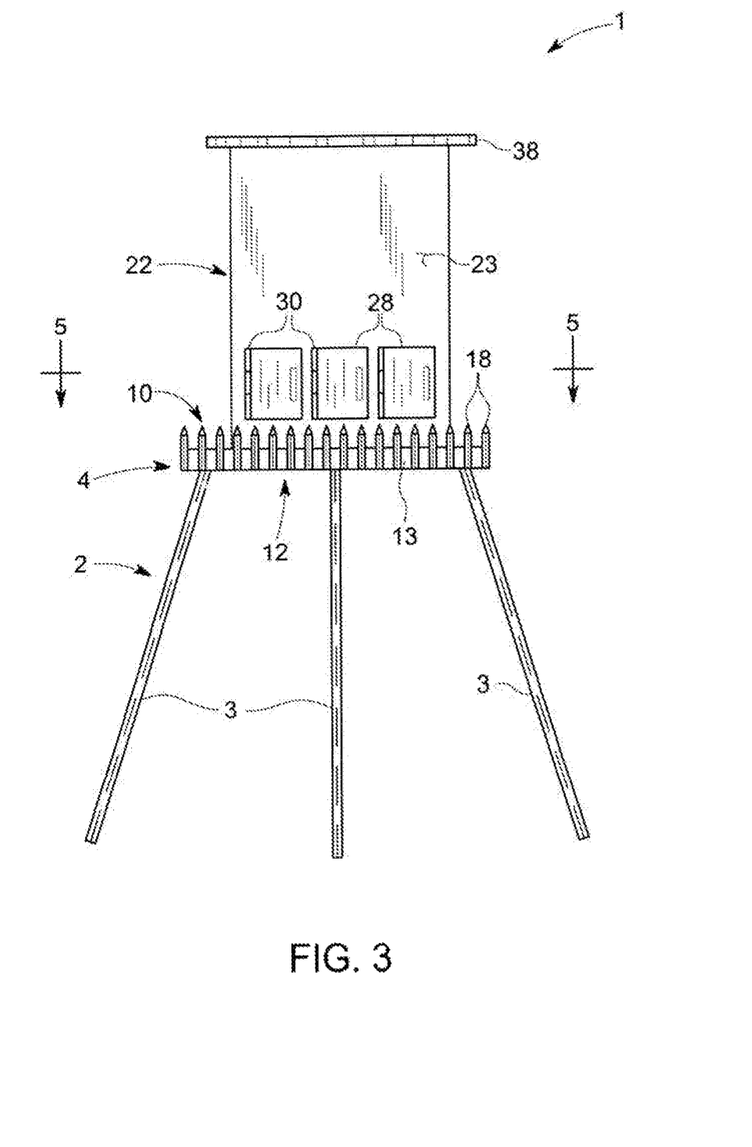
FIG. 3 is a front view of the illustrative scavenging animal deterring feeder assembly.
Figure 4:
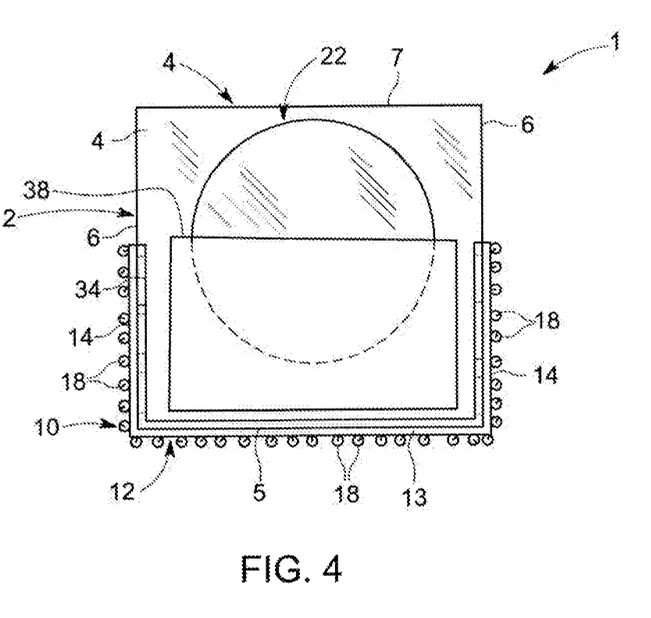
FIG. 4 is a top view of the illustrative scavenging animal deterring feeder assembly.

Referring next to FIGS. 1-8 of the drawings, the assembly 1 may include a feeder support stand 2 having an elevated stand platform 4. In some embodiments, the feeder support stand 2 may include at least one stand leg 3, and typically, a tripod arrangement of the stand legs 3, as illustrated, and the stand platform 4 may be supported by the stand legs 3. As illustrated in FIGS. 1 and 2, in some embodiments, a platform support frame 8 may be provided on the stand legs 3. The stand platform 4 may be supported by the platform support frame 8. In some embodiments, the lengths of the stand legs 3 may be sufficient to support the stand platform 4 at a height of about 30 inches above the ground or other support surface 48 (FIG. 9) on which the assembly 1 is deployed. The stand legs 3 and the platform support frame 8 may include square tubing, for example and without limitation.

A stand fence 10 may be deployed on the stand platform 4. The stand fence 10 may include a plurality of spaced-apart, upward-standing fence spikes 18. In some embodiments, the stand fence 10 may include a fence frame 12. The fence frame 12 may include an elongated strip or segment of angled metal or other material which is suitable to provide a support structure for the fence spikes 18. The fence spikes 18 may be supported by the fence frame 12. For example and without limitation, in some embodiments, the fence spikes 18 may be welded to the fence frame 12. In other embodiments, the fence spikes 18 may be casted, molded or otherwise fabricated in one piece with the fence frame 12. In still other embodiments, the fence spikes 18 may be attached to the fence frame 12 using screws, clips, clamps, brackets and/or mechanical fasteners known by those skilled in the art.

Figure 5:
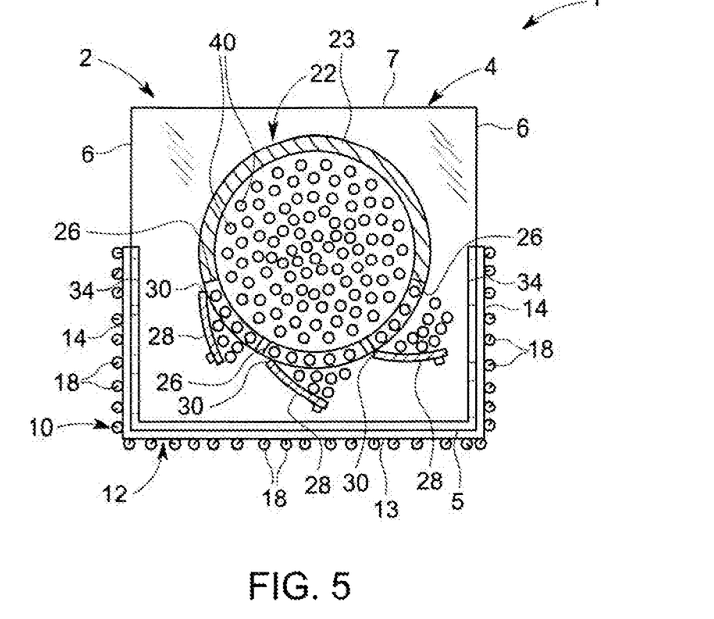
FIG. 5 is a sectional view, taken along section lines 5-5 in FIG. 3, of the illustrative scavenging animal deterring feeder assembly.

The feed-dispensing wildlife feeder 22 may be supported by the stand platform 4 of the feeder support stand 2. The feed-dispensing wildlife feeder 22 may be at least partially enclosed by the stand fence 10. As illustrated in FIG. 5, the wildlife feeder 22 may have a feeder wall 23 which encloses a feeder interior 24. A removable or pivoting feeder lid (not illustrated) may be provided on the upper end of the feeder wall 23 to facilitate opening and closing of the feeder interior 24. At least one feed dispensing opening 26 may extend through the feeder wall 23. At least one feeder door 28 may reversibly close each feed dispensing opening 26. Each feeder door 28 may be pivotally attached to the feeder wall 23 via at least one door hinge 30. As further illustrated in FIG. 5, the feeder interior 24 may be sized and configured to accommodate a supply of animal feed 40 in typical application of the assembly 1, which will be hereinafter described. Upon opening of the feeder door 28, a portion of the animal feed 40 may flow by gravity from the feeder interior 24 through the feed dispensing opening 26 onto the surface of the stand platform 4 for purposes which will be hereinafter described. The feed dispensing opening or openings 26 in the feeder wall 23 may be positioned behind the stand fence 10 such that the animal feed 40 which is dispensed from the wildlife feeder 22 onto the stand platform 4 is at least partially enclosed by the stand fence 10.

The stand platform 4 of the feeder support stand 2 may include a plurality of platform edges 5, 6, 7. The stand fence 10 may extend along at least a portion of at least three of the plurality of platform edges 5, 6, 7. In some embodiments, the stand platform 4 may include a square plate of steel or other metal or material having a size of 2'×2'. Accordingly, the stand platform 4 may have a front platform edge 5, a pair of side platform edges 6 and a rear platform edge 7. The fence frame 12 of the stand fence 10 may include a front frame segment 13 which extends along the front platform edge 5 of the stand platform 4. A pair of side frame segments 14 may extend from opposite ends of the front frame segment 13 along at least a portion of each corresponding side platform edge 6 of the stand platform 4. In some embodiments, the fence frame 12 may additionally include a rear frame segment (not illustrated) which extends along at least a portion of the rear platform edge 7 of the stand platform 4. In some embodiments, the fence frame 12 may be continuous or uninterrupted and may extend along the entire lengths of the front platform edge 5, the side platform edges 6 and the rear platform edge 7 of the stand platform 4. In other embodiments, the stand platform 4 may have other shapes and sizes and the fence frame 12 configured accordingly.

A feeder cover 38 may be provided on the wildlife feeder 22. The feeder cover 38 may protrude forwardly in covering relationship to the portion of the stand platform 4 which extends beneath the feed dispensing openings 26 in the feeder wall 23. Accordingly, the feeder cover 38 may prevent or hinder rain and other precipitation from falling on the animal feed 40 which is dispensed from the feeder interior 24 through the feed dispensing openings 26 onto the stand platform 4 behind the stand fence 10.

Figure 6:
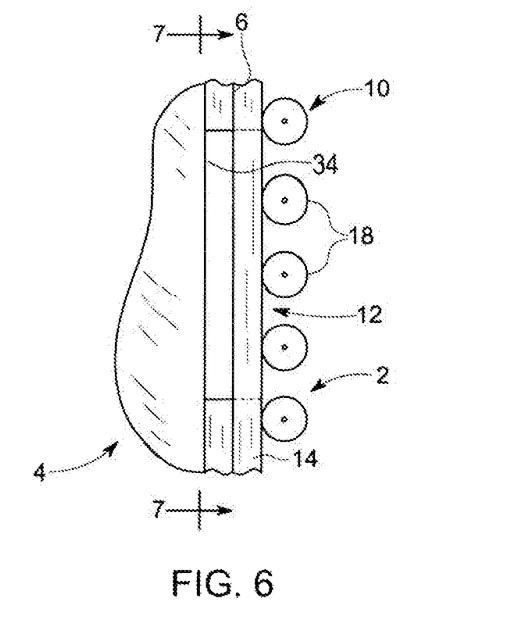
FIG. 6 is an enlarged sectional view, taken along section line 6 in FIG. 5, of a typical stand fence of the assembly.
Figure 7:
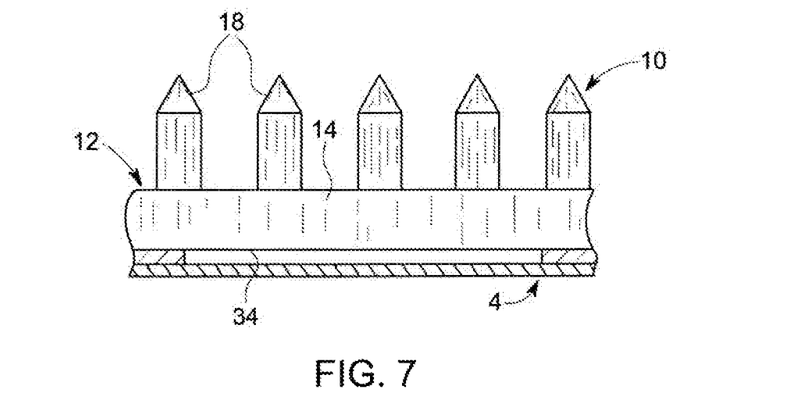
FIG. 7 is a sectional view, taken along section lines 7-7 in FIG. 6, of the stand fence, more particularly illustrating a drain slot extending through the stand fence.
Figure 8:
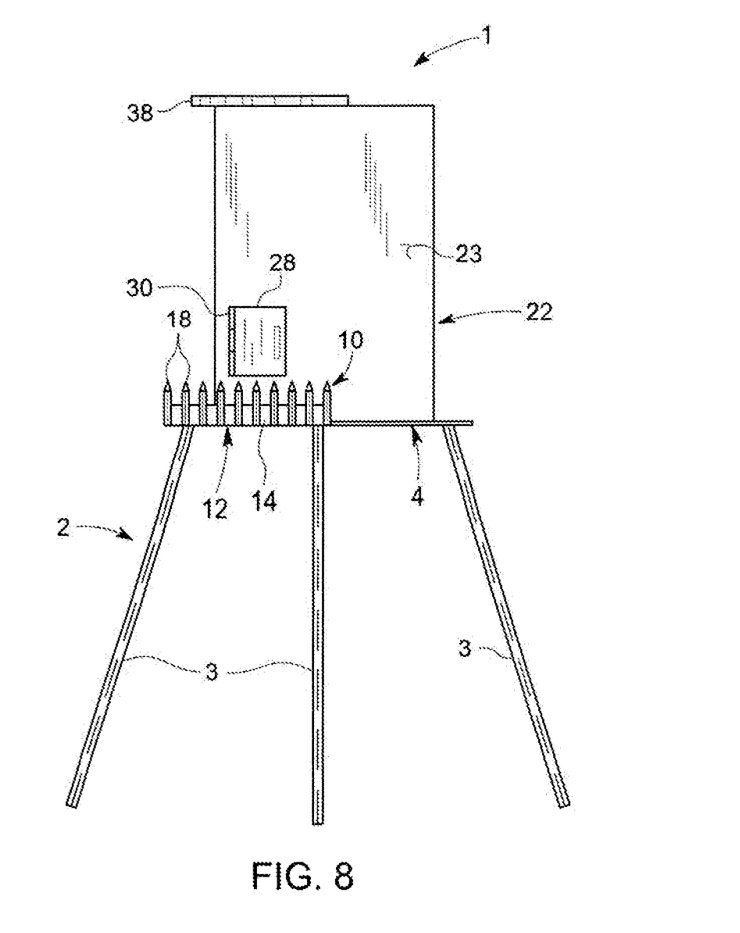
FIG. 8 is a left side view of the illustrative scavenging animal deterring feeder assembly.

As illustrated in FIGS. 5-7, at least one drain slot 34 may extend through the fence frame 12 of the stand fence 10. In some embodiments, a drain slot 34 may extend through each side frame segment 14 of the fence frame 12. The drain slot or slots 34 may facilitate drainage of water or other precipitation from the stand platform 4 through the stand fence 10 to prevent the precipitation from accumulating on the stand platform 4.

The feeder support stand 2 including the stand legs 3, the stand platform 4 and the stand fence 10 may be fabricated of steel, aluminum and/or other metals as well as high-density plastics, composite materials and the like using casting, molding, machining and/or other fabrication techniques known by those skilled in the art. The wildlife feeder 22 may be fabricated of like materials which are consistent with the functional requirements of the assembly 1.

Referring next to FIGS. 5 and 9 of the drawings, in typical application, the assembly 1 may be deployed on the ground or other supporting surface 48 in an area to which deer and/or other wildlife (not illustrated) are to be attracted for hunting, observation and/or other purposes. Accordingly, the stand legs 3 may support the stand platform 4 at the selected elevation above the ground 44. A supply of animal feed 40 (FIG. 5) may be placed in the feeder interior 24 of the wildlife feeder 22. In some embodiments, this may be accomplished by removing the feeder lid (not illustrated) from the upper end of the feeder wall 23, placing the animal feed 40 in the feeder interior 24 and replacing the feeder lid on the feeder wall 23. One or more of the feeder doors 28 may be opened to facilitate gravity flow of a portion of the animal feed 40 from the feeder interior 24 through the corresponding feed dispensing opening 26 and onto the stand platform 4, respectively, inside the stand fence 10, as illustrated in FIG. 5. Accordingly, deer and other wildlife (not illustrated) can access the animal feed 40 for consumption typically by extending the snout over the stand fence 10. The feeder cover 38 on the wildlife feeder 22 may prevent or minimize fall of rain and/or other precipitation onto the animal feed 40 which is dispensed onto the stand platform 4. Any precipitation which falls onto the stand platform 4 may drain from the surface of the stand platform 4 through the drain slot or slots 34 (FIGS. 6 and 7) in the fence frame 12.

As illustrated in FIG. 9, a scavenging animal 42, particularly a wild hog, will attempt to collapse the feeder support stand 2 to access the animal feed 40 which is dispensed onto the stand platform 4, as well as the animal feed 40 which remains in the wildlife feeder 22, typically by standing on its hind legs 43 and forcefully moving and landing its front paws 44 downwardly against the stand platform 4. However, the upward-standing fence spikes 18 on the stand fence 10 deter the scavenging animal 42 from landing its front paws 44 onto the platform 4. Consequently, the animal feed 40 remains undisturbed and can be consumed by the wildlife as they are attracted to the area in which the wildlife feeder 22 is deployed.

Referring next to FIGS. 10-16 of the drawings, an alternative illustrative embodiment of the scavenging animal deterring feeder assembly, hereinafter assembly, is generally indicated by reference numeral 101. Unless otherwise noted, the elements or components of the assembly 101 which correspond or are functionally or structurally analogous to the respective elements or components of the assembly 1 which was heretofore described with respect to FIGS. 1-9 are indicated by the same respective reference numerals.

Figure 10:
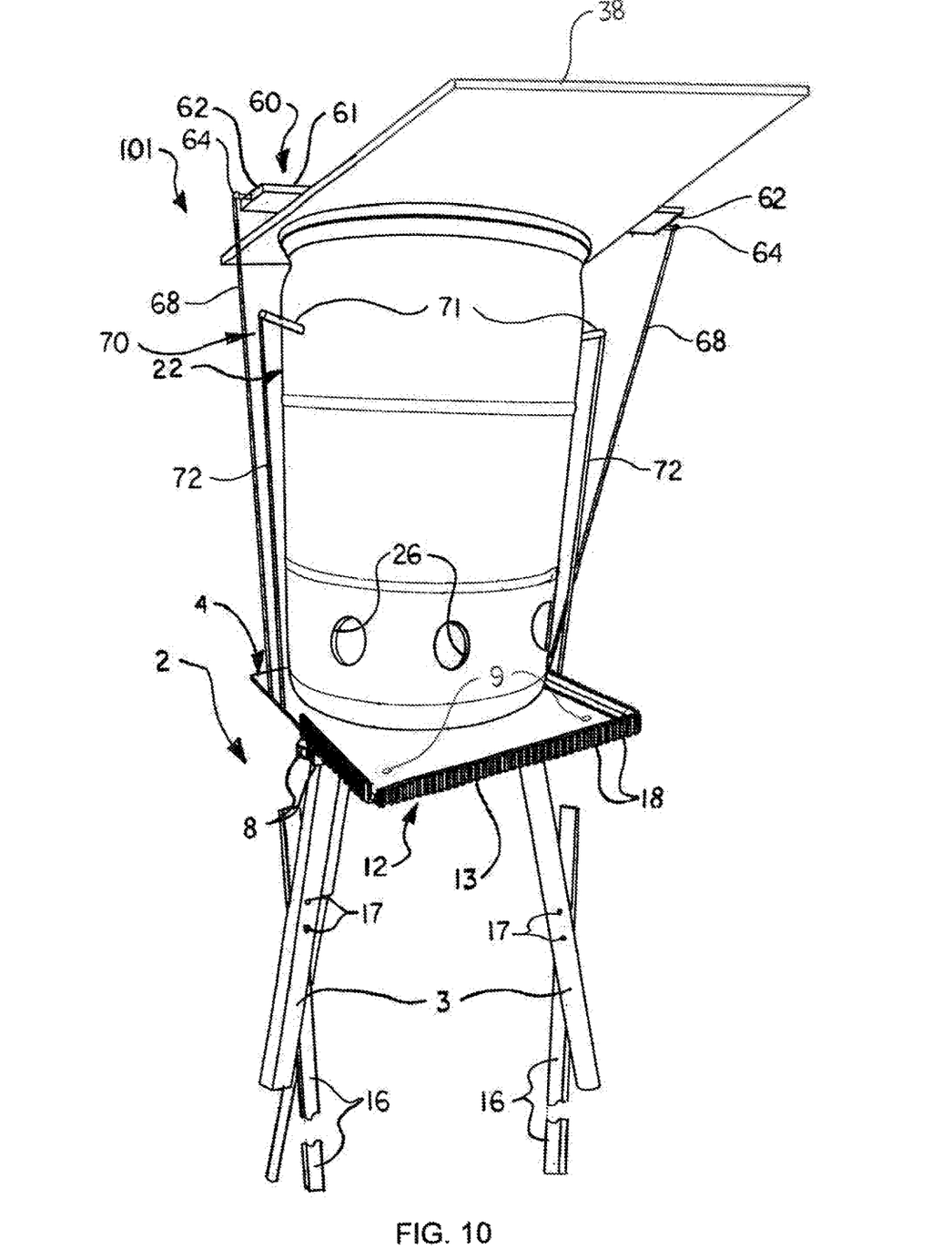
FIG. 10 is a front perspective view of an alternative illustrative embodiment of the scavenging animal deterring feeder assembly.
Figure 11:
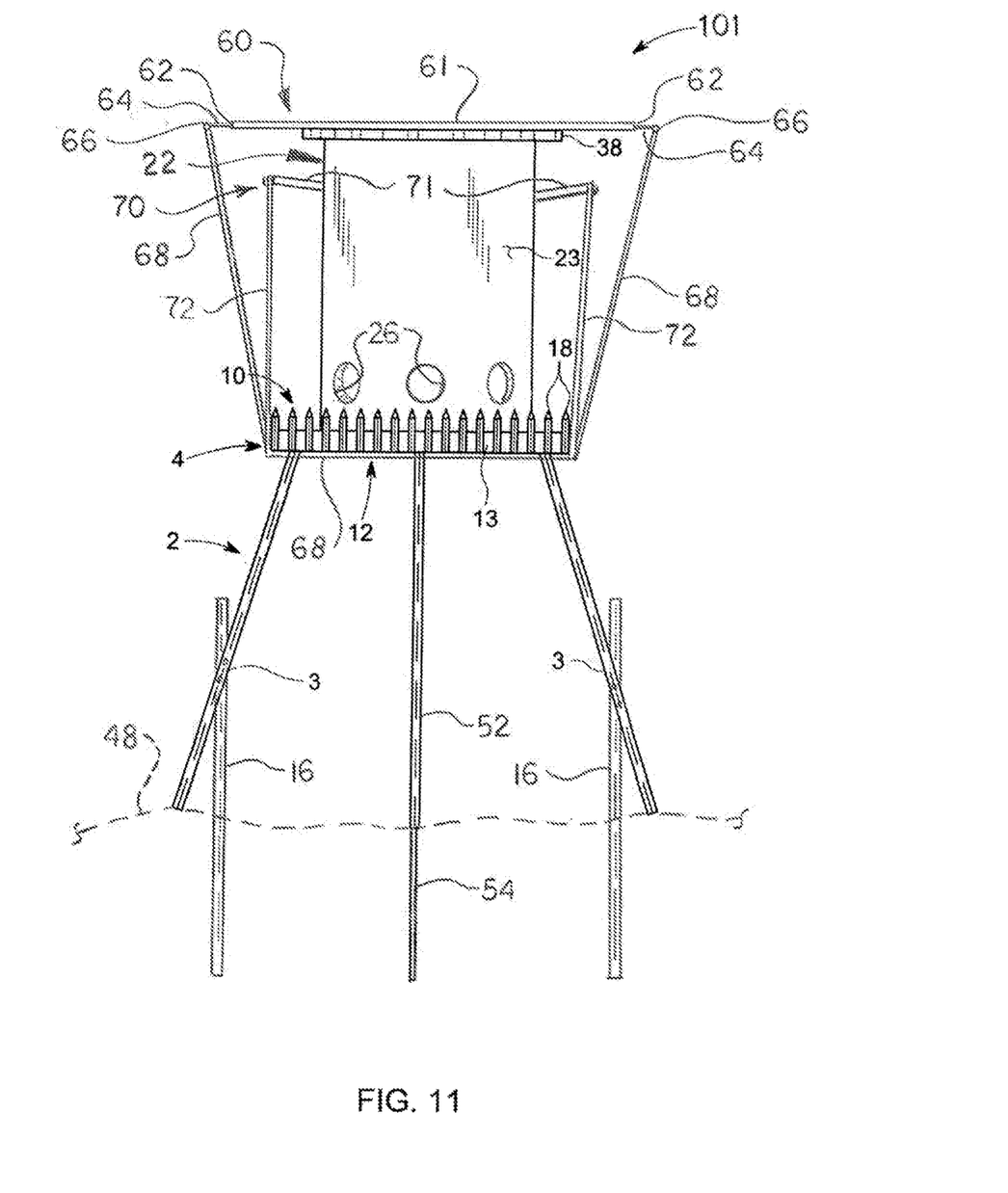
FIG. 11 is a front view of the illustrative scavenging animal deterring feeder assembly illustrated in FIG. 10.
Figure 12:
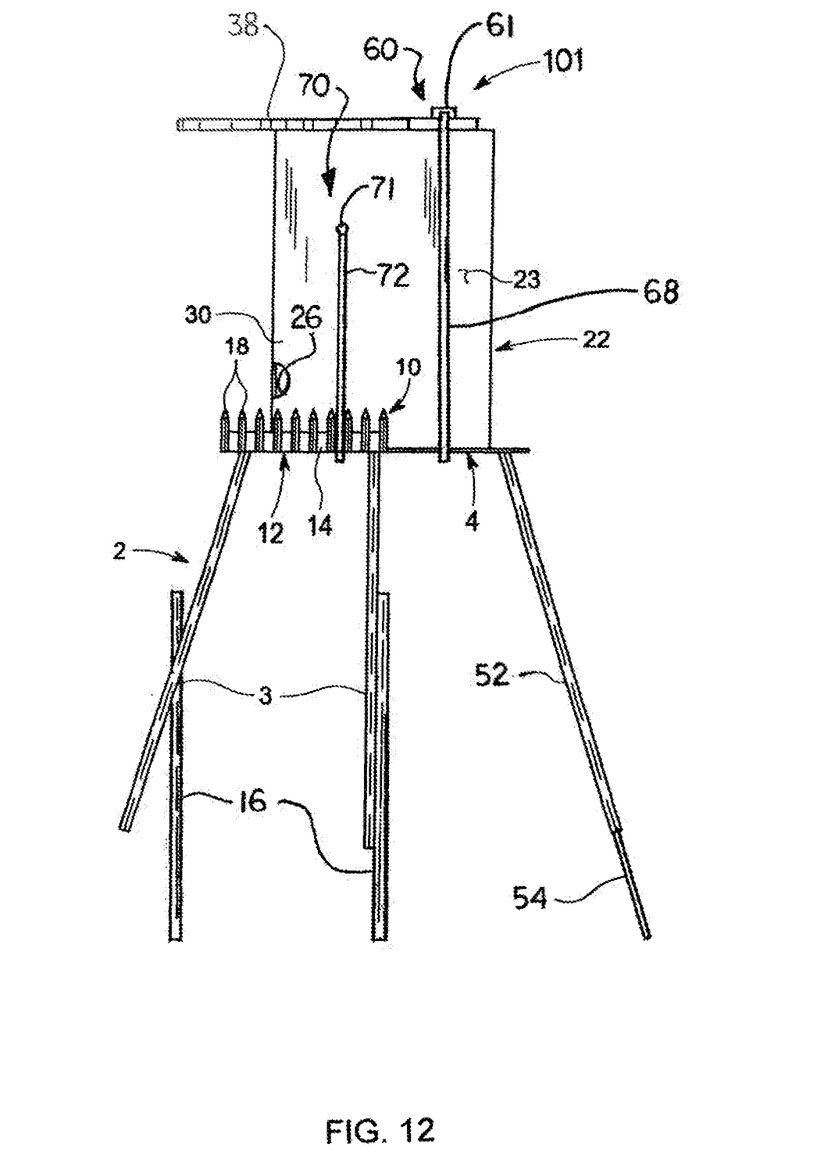
FIG. 12 is a side view of the illustrative scavenging animal deterring feeder assembly illustrated in FIG. 10.

The feeder support stand 2 of the assembly 101 may have a pair of front stand legs 3 and a rear stand leg 52 (FIGS. 11-13) which extend downwardly from the platform support frame 8. As illustrated in FIGS. 10-12, leg insertion members 16 may extend downwardly from the respective front stand legs 3 of the feeder support stand 2. The leg insertion members 16 may be attached to the respective front stand legs 3 using any suitable attachment technique known by those skilled in the art. In some embodiments, at least one fastener 17 such as a screw, bolt or nail, for example and without limitation, may facilitate the attachment. In other embodiments, alternative attachment mechanisms known by those skilled in the art, such as brackets, clips and/or clamps, for example and without limitation, may be additionally or alternatively be used. In some embodiments, the leg insertion members 16 may be molded, casted and/or otherwise formed integrally with the respective front stand legs 3 according to the knowledge of those skilled in the art. Accordingly, as illustrated in FIG. 11, in typical application of the assembly 101, which will be hereinafter further described, the leg insertion members 16 may be inserted in the ground 48 to secure or stabilize the respective front stand legs 3 of the assembly 101 on the surface of the ground 48.

Figure 13:
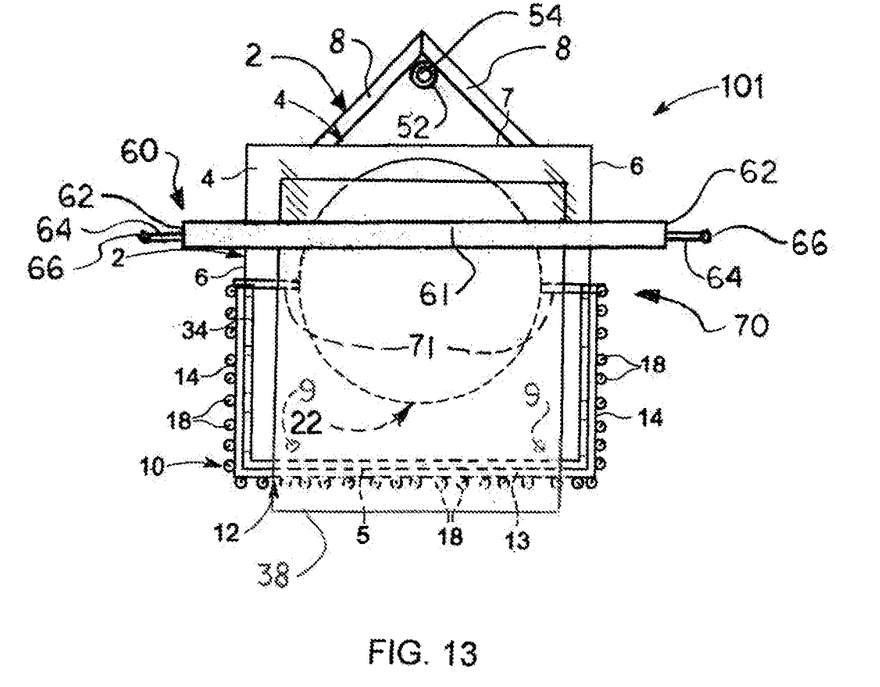
FIG. 13 is a top view of the illustrative scavenging animal deterring feeder assembly illustrated in FIG. 10.
Figure 15:
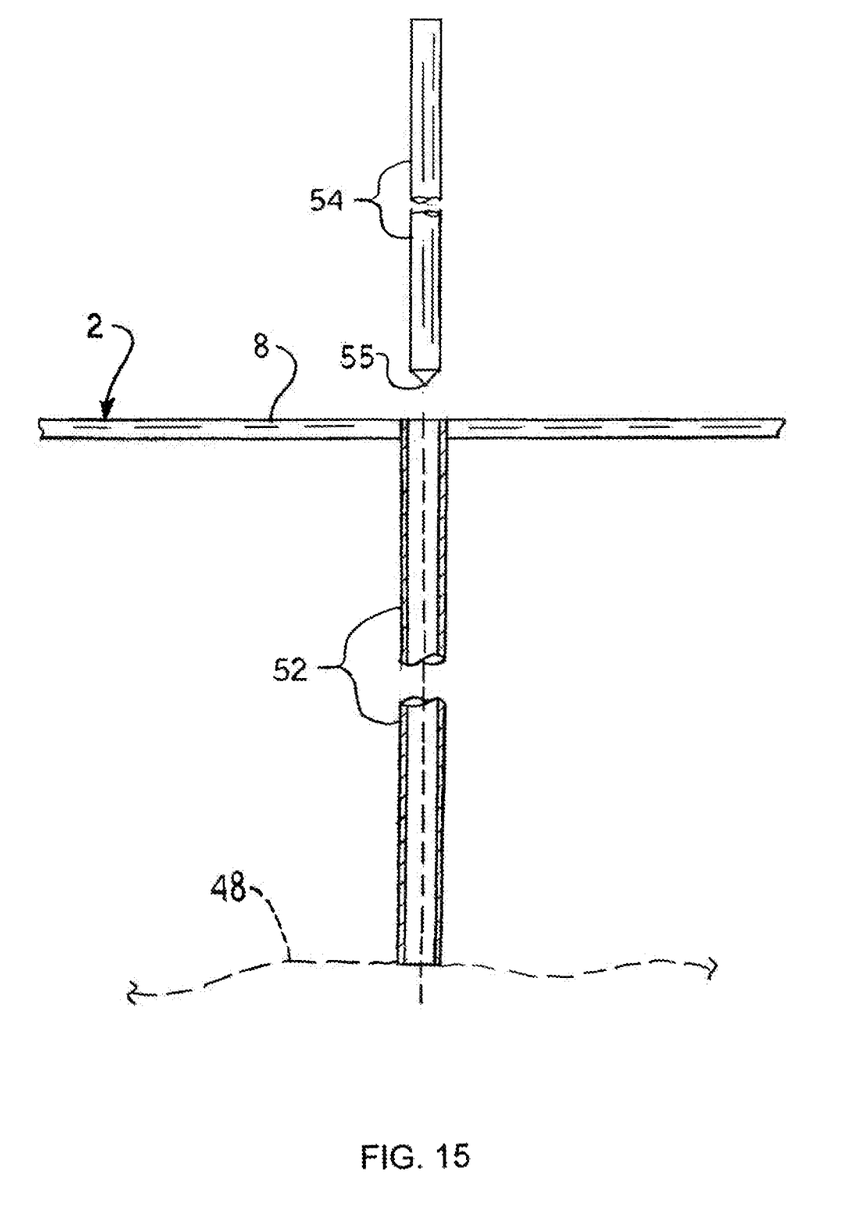
FIG. 15 is a partially-sectioned exploded view of a typical rear stand leg of the feeder support stand of the illustrative scavenging animal deterring feeder assembly illustrated in FIG. 10, more particularly illustrating extension of a leg insertion member through a rear stand leg of the feeder support stand and into the ground in typical deployment of the assembly.
Figure 16:
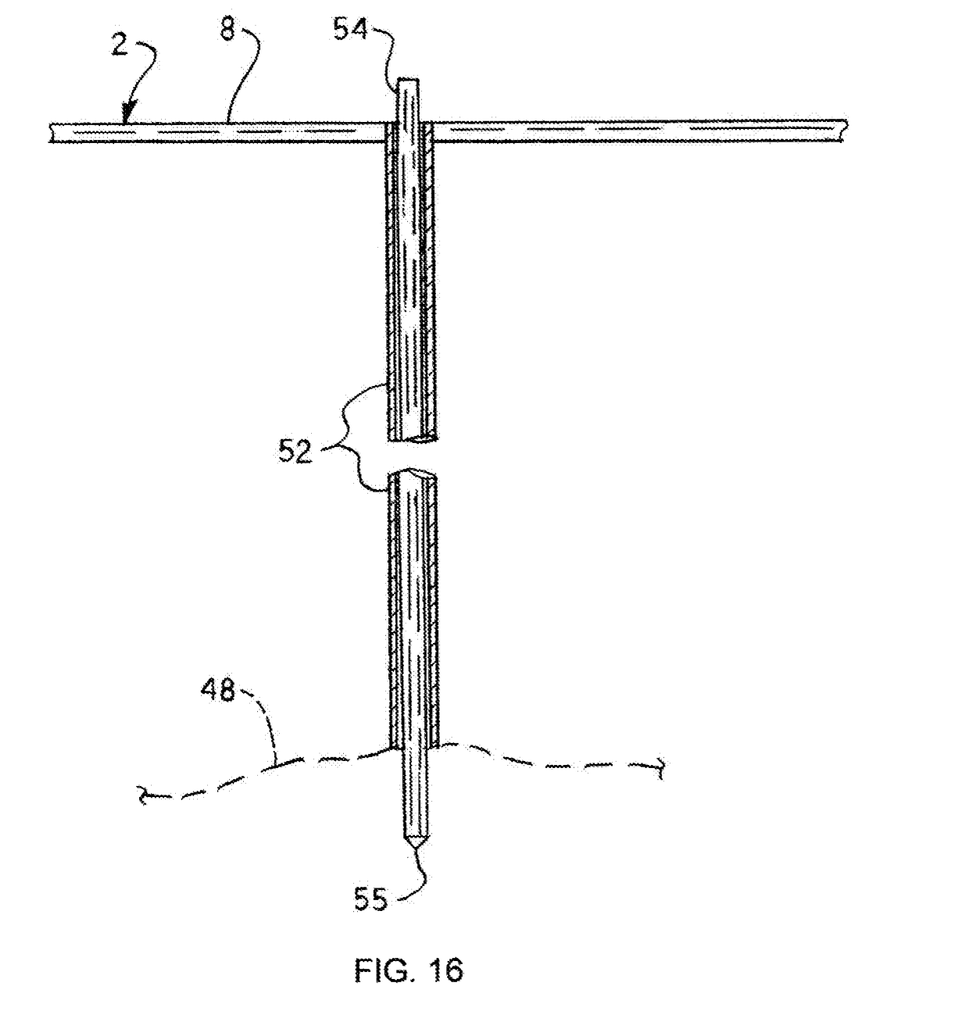
FIG. 16 is a partially-sectioned exploded view of the typical rear stand leg of the feeder support stand illustrated in FIG. 15, with the leg insertion member inserted into the ground.

As illustrated in FIG. 13, in some embodiments, the platform support frame 8 of the stand platform 4 may extend rearwardly beyond the rear platform edge 7 of the stand platform 4. The rear stand leg 52 may extend downwardly from the platform support frame 8. The upper end of the rear stand leg 52 may be open and exposed through the platform support frame 8, behind the rear platform edge 7 of the stand platform 4. Accordingly, as illustrated in FIGS. 15 and 16, a leg insertion member 54, which may have a tapered or sharpened leg insertion member tip 55, may be extended downwardly through the rear stand leg 52 and inserted in the ground 48 and then secured to the rear stand leg 52 using a retaining pin (not illustrated) or other retaining mechanism.

As further illustrated in FIGS. 10-12, in some embodiments, the feed dispensing openings 26 which extend through the feeder wall 23 of the wildlife feeder 22 may be circular in shape. In other embodiments, the feed dispensing openings 26 may be rectangular, triangular, oval or may have alternative shapes. The feed dispensing openings 26 may remain uncovered to facilitate exit of a limited quantity of the animal feed 40 (FIG. 5) from the wildlife feeder 22 onto the stand platform 4 of the feeder support stand 2 typically as the animal feed 40 is placed in the wildlife feeder 22.

Figure 14:
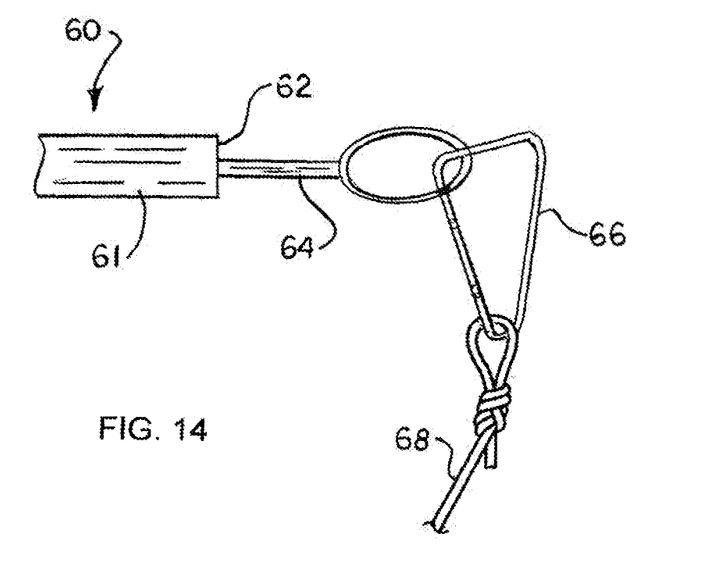
FIG. 14 is an enlarged sectional view illustrating a typical technique for attaching a cover retaining member to an assembly support member of a cover retaining assembly on the illustrative scavenging animal deterring feeder assembly illustrated in FIG. 10.

As illustrated in FIGS. 10-14, in some embodiments, a cover retaining assembly 60 may facilitate securement of the feeder cover 38 on the wildlife feeder 22. The cover retaining assembly 60 may include at least one elongated cover engaging member 61 which may extend across the top of the feeder cover 38. The cover engaging member 61 may have a pair of cover engaging member ends 62 which may protrude beyond the opposite side edges of the feeder cover 38. At least one cover retaining member 68 may be attached to the cover engaging member 31 and engage the stand platform 4 of the feeder support stand 2. The cover retaining member 68 may include at least one strap, cord, rope, belt or like elongated member. In some embodiments, the cover retaining member 68 may have opposite cover retaining member ends (not numbered) which may be attached to the respective cover engaging member ends 62 of the cover engaging member 61 according to the knowledge of those skilled in the art. In some embodiments, a cover retaining member hook 64 may extend from each cover engaging member end 62 of the cover engaging member 61, and the cover retaining member ends of the cover retaining member 68 may be attached to the respective cover retaining member hooks 64. The cover retaining member 68 may extend downwardly from one cover retaining member hook 64, beneath and across the width of the stand platform 4 and upwardly to attach to the other cover retaining member hook 64 and secure or retain the feeder cover 38 on the wildlife feeder 22. At least one of the cover retaining member ends may be releasably attached to the corresponding cover retaining member hook 64 according to the knowledge of those skilled in the art. Accordingly, as illustrated in FIG. 14, in some embodiments, a linkage member 66 may releasably attach the cover retaining member 68 to at least one of the cover retaining member hooks 64. The linkage member 66 may include a carabiner, hook, clip, clamp, mechanical fastener and/or other component or element which is suitable for the purpose. As illustrated in FIGS. 10, 12 and 13, in some embodiments, the feeder cover 38 may extend forwardly beyond the front platform edge 5 of the feeder cover 38. Accordingly, the extending feeder cover 38 may cover or shield the animal feed 40 (FIG. 5) which is dispensed from the wildlife feeder 22 through the feed dispensing openings 26 and onto the stand platform 4 from rain and/or other precipitation. At least one drain opening 9 may extend through the stand platform 4 to facilitate drainage of the precipitation from the stand platform 4 onto the underlying ground or other surface.

In some embodiments, a feeder retaining assembly 70 may facilitate securement of the wildlife feeder 22 on the stand platform 4 of the feeder support stand 2. The feeder retaining assembly 70 may include a feeder retaining member 72 which is attached to the wildlife feeder 22 and engages the stand platform 4 of the feeder support stand 2. The feeder retaining member 72 may include at least one strap, cord, rope, belt or like elongated member. In some embodiments, a pair of retaining member hooks 71 may extend from opposite sides of the feeder wall 23 of the wildlife feeder 22. The feeder retaining member 72 may have opposite ends which are attached to the respective retaining member hooks 71. Accordingly, the feeder retaining member 72 may have a first retaining member end which is attached to one of the retaining member hooks 71 and a second retaining member end which is attached to a second one of the retaining member hooks 71. The feeder retaining member 72 may extend downwardly from one feeder retaining member hook 71, beneath and across the width of the stand platform 4 and upwardly to attach to the other feeder retaining member hook 71 and secure or retain the wildlife feeder 22 on the stand platform 4 of the feeder support stand 2. At least one of the first and second retaining member ends may be releasably attached to the corresponding retaining member hook 71, such as via a mechanism similar to the cover retaining member hook 64 and the linkage member 66 which was heretofore described with respect to the cover retaining assembly 60 in FIG. 14.

Application of the assembly 101 may be as was heretofore described with respect to the assembly 1 in FIGS. 1-9. In deployment of the assembly 1, the leg insertion members 16 may be attached to the respective front stand legs 3 and inserted into the ground 48, as illustrated in FIG. 11, typically until each front stand leg 3 rests on the surface of the ground 48. As illustrated in FIGS. 15 and 16, the rear stand leg 52 may be deployed in place by placing the rear stand leg 52 on the ground 48 and extending the leg insertion member 54 downwardly through the rear stand leg 52 and into the ground 48. A retaining pin (not illustrated) or other retaining mechanism may be used to secure the leg insertion member 54 in the rear stand leg 52.

After the wildlife feeder 22 is placed on the stand platform 4 of the feeder support stand 2, the feeder retaining assembly 70 may be deployed typically by attaching the first feeder retaining member end of the feeder retaining member 72 to one of the retaining member hooks 71 and extending the second feeder retaining member end of the feeder retaining member 72 downwardly beneath and across the stand platform 4 and upwardly for attachment to the other of the retaining member hooks 71. The feeder cover 38 may be placed on the wildlife feeder 22 and the cover retaining assembly 60 deployed in place typically by attaching the first cover retaining member end of the cover retaining member 68 to one of the cover retaining member hooks 64 and extending the second cover retaining member end of the cover retaining member 68 downwardly beneath and across the stand platform 4 and upwardly for attachment to the other of the cover retaining member hooks 64. At least one of the cover retaining member ends of the cover retaining member 68 may be releasably attached to the corresponding one of the cover retaining member hooks 64 using the linkage member 66 (FIG. 14). Similarly, at least one of the feeder retaining member ends of the feeder retaining member 72 may be releasably attached to the corresponding one of the retaining member hooks 71 using the linkage member 66.

A supply of animal feed 40 (FIG. 5) may be placed in the wildlife feeder 22 before or after deployment of the feeder cover 38 on the wildlife feeder 22. Accordingly, a limited supply of the animal feed 40 may fall from the wildlife feeder 22 through the feed dispensing openings 26 and onto the stand platform 4 of the feeder support stand 2 for access by wildlife (not illustrated) which are to be attracted to the assembly 101 for hunting, observational and/or other purposes.

In the event that a scavenging animal 42 (FIG. 9) such as a wild hog attempts to collapse the feeder support stand 2 to access the animal feed 40 on the stand platform 4 and inside the wildlife feeder 22, typically by standing on its hind legs 43 and forcefully moving and landing its front paws 44 downwardly against the stand platform 4, the upward-standing fence spikes 18 on the stand fence 10 deter the scavenging animal 42 from landing its front paws 44 onto the platform 4. Consequently, the animal feed 40 remains undisturbed and can be consumed by the wildlife as they am attracted to the area in which the wildlife feeder 22 is deployed. In the event that the scavenging animal 42 strikes or wind blows against the assembly 101, the cover retaining assembly 60 may prevent the feeder cover 38 from falling off the wildlife feeder 22. In like manner, the feeder retaining assembly 70 may prevent the wildlife feeder 22 from falling off the stand platform 4. Additionally, the leg insertion members 16 on the respective front stand legs 3 and the leg insertion member 54 which extends from the rear stand leg 52 into the ground 48 may stabilize and prevent the feeder support stand 2 from falling over onto the ground 48.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A scavenging animal deterring feeder assembly, comprising:
    a feeder support stand including:
        an elevated, generally rectangular stand platform having a front platform edge, a pair of side platform edges and a rear platform edge; and
        a stand fence having:
            a fence frame upward standing from the stand platform, the fence frame extending at least along the front platform edge and at least a portion of the pair of side platform edges, respectively, of the stand platform; and
            a plurality of spaced-apart, upward-standing fence spikes carried by the fence frame;
    a fed-dispensing wildlife feeder carried by the stand platform of the feeder support stand and at least partially enclosed by the stand fence;
    a feeder retaining assembly retaining the feed-dispensing wildlife feeder on the stand platform, the feeder retaining assembly including a feeder retaining member attached to the feed-dispensing wildlife feeder and extending beneath and across the stand platform of the feeder support stand;
    a feeder cover carried by the feed-dispensing wildlife feeder; and
    a cover retaining assembly retaining the feeder cover on the feed-dispensing wildlife feeder.

2. The scavenging animal deterring feeder assembly of claim 1 wherein the cover retaining assembly comprises a cover engaging member engaging the feeder cover and a cover retaining member attached to the cover engaging member and engaging the elevated stand platform.

3. The scavenging animal deterring feeder assembly of claim 2 wherein the cover retaining member extends beneath and across the stand platform of the feeder support stand.

4. The scavenging animal deterring feeder assembly of claim 2 further comprising at least one linkage member releasably attaching the cover retaining member to the cover engaging member.

5. The scavenging animal deterring feeder assembly of claim 1 further comprising a pair of retaining member hooks on the feed-dispensing wildlife feeder, and wherein the feeder retaining member is attached to the pair of retaining member hooks.

6. The scavenging animal deterring feeder assembly of claim 1 wherein the feeder support stand comprises a pair of front stand legs and a rear stand leg extending from the elevated stand platform and a pair of leg insertion members carried by the pair of front stand legs, respectively, the pair of leg insertion members configured for insertion in the ground.

7. The scavenging animal deterring feeder assembly of claim 6 further comprising a leg insertion member extending from the rear stand leg and configured for insertion in the ground.

8. A scavenging animal deterring feeder assembly, comprising:
a feeder support stand including:
a plurality of stand legs;
an elevated, generally rectangular stand platform carried by the plurality of stand legs, the stand platform having a front platform edge, a pair of side platform edges and a rear platform edge; and
a stand fence having:
a fence frame upward standing from the stand platform, the fence frame including a front frame segment extending along the front platform edge and a pair of side frame segments extending along at least a portion of the side platform edges, respectively, of the stand platform;
a plurality of spaced-apart, upward-standing fence spikes carried by the fence frame; and
at least one drain slot in the fence frame;
a feed-dispensing wildlife feeder carried by the stand platform of the feeder support stand and at least partially enclosed by the stand fence;
a feeder retaining assembly retaining the feed-dispensing wildlife feeder on the stand platform, the feeder retaining assembly including:
a pair of retaining member hooks carried by the feed-dispensing wildlife feeder; and
a feeder retaining member attached to the pair of retaining member hooks and extending beneath and across the stand platform of the feeder support stand;
a feeder cover carried by the feed-dispensing wildlife feeder; and
a cover retaining assembly retaining the feeder cover on the feed-dispensing wildlife feeder, the cover retaining assembly including:
a cover engaging member engaging the feeder cover; and
a cover retaining member attached to the cover engaging member and extending beneath and across the stand platform.

9. The scavenging animal deterring feeder assembly of claim 8 further comprising at least one linkage member releasably attaching the cover retaining member to the cover engaging member of the cover retaining assembly.

10. The scavenging animal deterring feeder of claim 8 wherein the plurality of stand legs comprises a pair of front stand legs and a rear stand leg extending from the stand platform and a pair of leg insertion members carried by the pair of front stand legs, respectively, the pair of leg insertion members configured for insertion in the ground.

11. The scavenging animal deterring feeder assembly of claim 10 further comprising a leg insertion member extending from the rear stand leg and configured for insertion in the ground.

12. The scavenging animal deterring feeder assembly of claim 11 wherein the rear stand leg has an open upper end configured to receive the leg insertion member.

* * * * *